(12) United States Patent
Katsura et al.

(10) Patent No.: US 9,685,662 B2
(45) Date of Patent: Jun. 20, 2017

(54) ELECTRODE MATERIAL, ELECTRODE MATERIAL MANUFACTURING METHOD, ELECTRODE, AND SECONDARY BATTERY

(71) Applicant: KOBE STEEL, LTD., Kobe-shi (JP)

(72) Inventors: Sho Katsura, Hyogo (JP); Satoru Takada, Hyogo (JP); Mamoru Hosokawa, Hyogo (JP); Toshiki Sato, Hyogo (JP)

(73) Assignee: Kobe Steel, Ltd., Kobe-shi (JP)

( * ) Notice: Subject to any disclaimer, the term of this patent is extended or adjusted under 35 U.S.C. 154(b) by 248 days.

(21) Appl. No.: 14/353,364

(22) PCT Filed: Oct. 22, 2012

(86) PCT No.: PCT/JP2012/077217
§ 371 (c)(1),
(2) Date: Apr. 22, 2014

(87) PCT Pub. No.: WO2013/061914
PCT Pub. Date: May 2, 2013

(65) Prior Publication Data
US 2014/0287319 A1    Sep. 25, 2014

(30) Foreign Application Priority Data

Oct. 25, 2011 (JP) ................. 2011-234320
Sep. 5, 2012 (JP) ................. 2012-194663

(51) Int. Cl.
*H01M 4/66* (2006.01)
*H01M 4/13* (2010.01)
(Continued)

(52) U.S. Cl.
CPC ........... *H01M 4/667* (2013.01); *H01M 4/661* (2013.01); *H01M 4/663* (2013.01); *H01M 4/668* (2013.01);
(Continued)

(58) Field of Classification Search
None
See application file for complete search history.

(56) References Cited

U.S. PATENT DOCUMENTS 4,581,116 A    4/1986 Plowman et al.
5,542,163 A *  8/1996 Chang ................. H01M 4/02
                                              29/2
(Continued)

FOREIGN PATENT DOCUMENTS

EP    1 387423 A1   2/2004
JP    6-260164 A    9/1994
(Continued)

OTHER PUBLICATIONS

Machine translation of JP2003-249223, printed Aug. 7, 2016.*
(Continued)

*Primary Examiner* — Maria J Laios
(74) *Attorney, Agent, or Firm* — Oblon, McClelland, Maier & Neustadt, L.L.P.

(57) ABSTRACT

An electrode material which has excellent tab weldability, realizes reduction of a contact resistance with an active material layer, and has good adhesion with a conductive material disposed in an island shape, is provided. An electrode material 1 includes a substrate 1a including a metal foil and a conductive material 1b containing carbon, wherein the conductive material 1b is disposed in an island shape on the surface of the substrate 1a when observed with a visual field of 300 μm square, and the conductive material is fixed to the surface of the substrate together with a hydrophobic resin and a water-soluble resin.

17 Claims, 4 Drawing Sheets

(51) Int. Cl.
*H01M 4/139* (2010.01)
*H01M 10/0525* (2010.01)

(52) U.S. Cl.
CPC .............. *H01M 4/13* (2013.01); *H01M 4/139* (2013.01); *H01M 10/0525* (2013.01); *Y02P 70/54* (2015.11)

(56) References Cited

U.S. PATENT DOCUMENTS

| | | | |
|---|---|---|---|
| 6,855,459 B2 * | 2/2005 | Matsubara | H01M 4/0404 429/217 |
| 8,663,845 B2 | 3/2014 | Ohmori | |
| 2003/0148187 A1 | 8/2003 | Yamaguchi et al. | |
| 2006/0275643 A1 | 12/2006 | Abd Elhamid et al. | |
| 2009/0029255 A1 | 1/2009 | Ohmori | |
| 2010/0075225 A1 * | 3/2010 | Wilkins | H01M 4/0404 429/212 |
| 2010/0159334 A1 | 6/2010 | Kashima et al. | |
| 2011/0027649 A1 | 2/2011 | Abe | |
| 2011/0274971 A1 | 11/2011 | Sakamoto | |

FOREIGN PATENT DOCUMENTS

| | | | | |
|---|---|---|---|---|
| JP | 9-97625 A | 4/1997 | | |
| JP | 10-144298 A | 5/1998 | | |
| JP | 2001-351612 A | 12/2001 | | |
| JP | 2003-249223 A | * 2/2002 | ............. | H01M 4/62 |
| JP | 2002-352796 A | 12/2002 | | |
| JP | 2003-249223 | 9/2003 | | |
| JP | 2006-4739 A | 1/2006 | | |
| JP | 2007-226969 A | 9/2007 | | |
| JP | 2009-252396 A | 10/2009 | | |
| JP | 2009-266466 A | 11/2009 | | |
| JP | 2010-86866 | 4/2010 | | |
| JP | 2010-135338 A | 6/2010 | | |
| JP | 2011-49231 | 3/2011 | | |
| JP | 2011-86636 A | 4/2011 | | |
| KR | 10-2011-0107401 A | 9/2011 | | |
| TW | 200913348 | 3/2009 | | |
| WO | WO 03/032418 A2 | 4/2003 | | |
| WO | WO 2009/011249 A1 | 1/2009 | | |

OTHER PUBLICATIONS

Extended European Search Report issued Jun. 17, 2015 in Patent Application No. 12843029.5.
International Search Report and Written Opinion issued Jan. 15, 2013 in PCT/JP2012/077217 with English Translation.

* cited by examiner

11(10)
14
13
14
12(10)

ELECTRODE MATERIAL, ELECTRODE MATERIAL MANUFACTURING METHOD, ELECTRODE, AND SECONDARY BATTERY

TECHNICAL FIELD

The present invention relates to an electrode material to be used for an electrode in a secondary battery, a method for manufacturing the same, an electrode using the electrode material, and a secondary battery using the electrode.

BACKGROUND ART

Studies on collectors in which a carbonaceous conductive material is applied on a metal foil such as an aluminum foil or a copper foil to be used as a substrate of an electrode for a secondary battery have been hitherto conducted in various research institutes. Also, a large number of patent applications have been filed and, for example, Patent Documents 1 to 4 are exemplified.

Patent Documents 1 and 2 describe collectors in which a film composed of carbon fine particles that are conductive materials and a film-forming compound is formed on the surface of a substrate such as an aluminum foil or a copper foil. Moreover, Patent Document 3 describes a collector in which a conductive layer composed of a carbon powder (conductive material) and a binder is placed between active materials. Further, Patent Document 4 describes a collector in which a conductive coating layer containing carbon as a conductive agent (conductive material) is placed on the surface. In these, internal resistance of batteries using these collectors is reduced by reducing contact resistance between the collectors and active material layers formed thereon, and thus it has been intended to improve high-speed charge-discharge characteristics and cycle characteristics of the batteries.

PRIOR ART DOCUMENTS

Patent Documents

Patent Document 1: JP-A-2007-226969
Patent Document 2: JP-A-2010-135338
Patent Document 3: JP-A-9-97625
Patent Document 4: JP-A-2001-351612

SUMMARY OF THE INVENTION

Problems that the Invention is to Solve

Here, the constitutions of the collectors in conventional technologies described in Patent Documents 1 to 4 are collectively explained with reference to FIG. 6. FIG. 6 is a schematic cross-sectional view for illustrating the constitutions of the collectors in the conventional technologies. As shown in FIG. 6, in a collector 3 in the conventional technologies, a conductive material layer 3b is homogeneously formed on the surface of a substrate 3a composed of a metal foil. Namely, the whole surface of the substrate 3a is covered with the conductive material layer 3b.

As shown in FIG. 6, when the conductive material layer 3b is homogeneously formed on the surface of the substrate 3a, there is a problem that the conductive material layer 3b hinders welding to worsen weldability when a metal-made tab (not shown in the figure) or the like for electrically connecting the collector 3 and a terminal of a battery, for preparing the battery using the collector 3, is welded on the surface.

In order to solve such a problem, the applicant of the present application has invented an electrode material (collector) which is constituted so that a conductive material is disposed in an island shape on the surface of a substrate. Thereby, reduction of contact resistance and weldability can be both achieved.

Here, for the following reason, it has been desired to further improve adhesion between the conductive material disposed in the island shape (hereinafter referred to as island structure as required) on the substrate surface and the substrate. In the case of preparing an electrode using the collector in which the conductive material is disposed in an island shape on the substrate surface, an active material layer is further applied and pressed on the island structure of the conductive material, so that the adhesion between the active material layer and the substrate is secured. However, in the case where the adhesion between the island structure of the conductive material and the substrate is weak, the island structure of the conductive material tends to be easily peeled by handling of the collector and contact of the surface of the collector with a roller equipped on a coating machine for the active material layer after the step of the formation of the island structure of the conductive material and throughout the coating step of the active material layer. Consequently, it is considered that the effect of reducing the contact resistance is decreased by the peeling of the island structure of the conductive material.

The present invention has been devised in view of the above-described problem and an object of the present invention is to provide: an electrode material which has excellent tab weldability, realizes reduction of the contact resistance with the active material layer, and has good adhesion between the conductive material disposed in the island shape and the substrate; a method for manufacturing the same; an electrode using the electrode material; and a secondary battery which realizes reduction of internal resistance by using the electrode.

Means for Solving the Problems

In order to solve the above problems, the electrode material according to the present invention contains: a substrate including a metal foil; and a conductive material placed on at least one surface of the substrate, wherein the conductive material is disposed in an island shape on the surface of the substrate when observed with a visual field of 300 μm square, and the conductive material is fixed to the surface of the substrate together with a hydrophobic resin and a water-soluble resin.

According to such a constitution, the surface of the substrate including the metal foil with the conductive material such as carbon has a portion which is not covered with the conductive material. Preferably, by controlling the coverage with the conductive material to 80% or less, the portion which is not covered with the conductive material becomes 20% or more. Therefore, in the case where the electrode material is used as a collector for an electrode in a lithium ion secondary battery, it becomes easy to weld a metal-made tab for connecting the collector and a terminal of the battery. Moreover, by placing the conductive material on the surface of the substrate so that the coverage preferably becomes 1% or more, in the case where the electrode material is used as a collector for an electrode in a lithium ion secondary battery, the contact resistance between the collector and the active material layer laminated on the collector is reduced. Further, the adhesion between the conductive material and the substrate is improved by the hydrophobic resin, and a coatability of the substrate with a slurry containing the conductive material on the substrate is improved by the water-soluble resin in the manufacturing step. Thereby, the island structure is disposed in an island structure as a mixture of the conductive material and these resins with good adhesion to the substrate that is a metal foil.

Furthermore, in the electrode material according to the present invention, the attached amount of the sum of the conductive material, the water-soluble resin, and the hydrophobic resin per unit area on the surface of the substrate is preferably in the range of 0.01 to 0.50 $g/m^2$. Here, the conductive material may be placed on one surface of the substrate or may be placed on both surfaces of the substrate, but the range of the above attached amount shows a preferable range on each surface on which the conductive material is placed.

According to such a constitution, the conductive material is disposed in the island shapes on the surface of the substrate by controlling the attached amount to the above range and the coverage is adjusted so that the substrate is appropriately exposed by controlling the attached amount to 0.50 $g/m^2$ or less, so that the metal-made tab or the like is satisfactorily welded. Moreover, by controlling the attached amount to 0.01 $g/m^2$ or more, in the case where the electrode material is used, for example, as a collector for the electrode in a lithium ion secondary battery, the contact resistance between the collector and the active material layer laminated on the collector is reduced.

The method for manufacturing the electrode material according to the present invention includes an application step of applying a slurry containing the conductive material, the water-soluble resin, and an aqueous emulsion solution of the hydrophobic resin on the surface of the substrate, and a drying step of drying the slurry in this order, wherein the conductive material is agglomerated in the solution before or after the slurry is applied on the substrate.

According to such a method, since an aqueous emulsion solution of the hydrophobic resin is used, the hydrophobic resin is homogeneously dispersed in the slurry. Moreover, since the water-soluble resin is mixed into the slurry, in the application step, wettability of the slurry containing the water-soluble resin is improved and thus the slurry is satisfactorily applied without being repelled on the surface of the substrate to form drops. Further, since the slurry containing the conductive material to be applied on the surface of the substrate is controlled so that the conductive material is agglomerated before application or after application, the conductive material in the slurry applied on the surface of the substrate is disposed in the island shape on the surface of the substrate. By drying the slurry in the drying step, the conductive material is fixed to the surface of the substrate together with the hydrophobic resin and the water-soluble resin.

In the method for manufacturing the electrode material according to the present invention, it is preferred that, in the application step, the slurry containing carbon as the conductive material in an amount of 0.1 to 7% by mass is applied on the surface of the substrate.

According to such a method, the conductive material is appropriately agglomerated in the slurry before or after the application on the substrate and the conductive material is disposed in the island shape on the surface of the substrate.

In the method for manufacturing the electrode material according to the present invention, it is preferred that, in the application step, the slurry contains the water-soluble resin in an amount of 0.25% by mass or more and the hydrophobic resin in an amount of 0.01% by mass or more, and a sum of the amount of the water-soluble resin and the amount of the hydrophobic resin in the slurry is 11% by mass or less.

According to such a method, the wettability of the slurry with respect to the substrate is appropriately improved by the water-soluble resin having the content in this range and the slurry is satisfactorily applied on the substrate. Moreover, the island structure is fixed to the substrate with good adhesion by the hydrophobic resin having the content in this range. Further, the effect of reducing the contact resistance can be obtained by controlling the content of all the resins to 11% by mass or less.

The electrode in a secondary battery according to the present invention is an electrode in a secondary battery using the above-described electrode material, wherein an active material layer is formed on a surface of the conductive material in the electrode material.

According to such a constitution, the contact resistance between the electrode material that is a collector and the active material layer is reduced by the conductive material disposed in the island shape on the surface of the substrate.

The secondary battery according to the present invention includes a positive electrode and a negative electrode, wherein at least one of the positive electrode and the negative electrode is the electrode according to the present invention.

According to such a constitution, since the contact resistance between the electrode material that is a collector and the active material layer is reduced in the electrode in the secondary battery, the internal resistance is reduced in the secondary battery.

Advantages of the Invention

According to the electrode material of the present invention, a conductive material is disposed in the island shape on the surface of a metal foil that is a substrate and the attached amount of the conductive material is limited, and thus, the contact resistance between the active material layer and the electrode material can be reduced while weldability of a tab or the like is secured. Moreover, the island structure is adhered to the metal foil that is a substrate using the hydrophobic resin and water-soluble resin as binders and thus peeling of the formed island structure can be suppressed during the handling of the electrode material and in the manufacturing step before coating with the active material layer, and the effect of reducing the contact resistance by the island structure is not impaired.

According to the method for manufacturing the electrode material of the present invention, since the island structure of the conductive material can be formed on the surface of the substrate with good adhesion, an electrode material having a good weldability of a tab or the like and capable of reducing the contact resistance with the active material layer, can be manufactured with stable quality. Moreover, owing to the use of an aqueous solution, an environmental load induced by solvent vapor in the manufacturing step can be reduced.

Further, according to the method for manufacturing the electrode material of the present invention, since the carbon is used in an appropriate concentration as a conductive material, an electrode material in which a suitable island structure is formed can be manufactured.

Furthermore, according to the method for manufacturing the electrode material of the present invention, since the resins are used in appropriate concentration, an electrode material having good quality can be manufactured.

According to the electrode of the present invention, the contact resistance between the electrode material and the active material layer can be reduced.

Moreover, according to the secondary battery of the present invention, internal resistance can be reduced.

EMBODIMENTS FOR CARRYING OUT THE INVENTION

Figure 1:
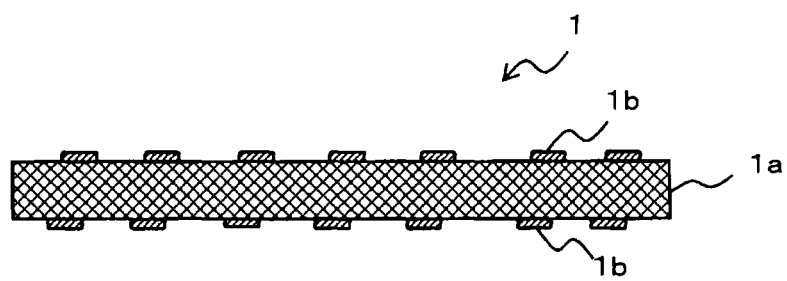
FIG. 1 is a schematic cross-sectional view for illustrating the structure of the collector according to the present invention.

The following will describe an embodiment of the electrode material (hereinafter also referred to as collector) according to the present invention in detail.
[Structure of Collector]

The structure of the collector according to the present embodiment will be described with reference to FIG. 1.

The collector (electrode material) 1 according to the present embodiment is composed of a substrate 1a composed of a metal foil and a conductive material 1b disposed in the island shape on the surface of the substrate 1a. Moreover, the conductive material 1b is disposed on both surfaces of the substrate 1a. The conductive material 1b may be disposed on one surface of the substrate 1a.

In the present specification, the "island shape" means a state where the conductive material 1b is disposed so that at least a part of the surface of the substrate 1a is exposed without being covered with the conductive material 1a. For example, a plurality of agglomerates of the conductive material 1b may be disposed with being isolated one another as shown in FIG. 1 or the agglomerates may be joined one another to be disposed in a reticulate form.

The collector 1 according to the present embodiment can be suitably used, for example, as a collector for an electrode in a lithium ion secondary battery. The electrode using the collector 1 will be described later.

By controlling the collector 1 so as to have a structure in which the conductive material 1b is disposed in the island shape on the surface of the substrate 1a when observed with a visual field of 300 μm square (i.e., a square visual field having an area of about 0.1 mm²) in an arbitrary region of the surface of the substrate 1a on which the conductive material 1b is disposed, in the case where the collector 1 is used as an electrode in the battery, tab weldability can be improved during welding a metal-made tab (not shown in the figure) that electrically connects the collector 1 with a terminal of the battery.

Moreover, the coverage of the surface of the substrate 1a with the conductive material 1b in the substrate 1a is preferably from 1 to 80% when observed with a visual field of 300 μm square in an arbitrary region of the surface of the substrate 1a on which the conductive material 1b is disposed. In the case where the coverage with the conductive material 1b is 1% or more, the contact resistance between the collector 1 and the active material layer 2 (see FIG. 2) to be laminated on the surface of the collector 1 in the case of using as an electrode in the secondary battery, can be further reduced. Further, by controlling the coverage of the surface of the substrate 1a with the conductive material 1b to 80% or less, further satisfactory tab weldability can be secured. The above coverage is more preferably from 10 to 70%, and further preferably from 30 to 60%.

The conductive material 1b is preferably disposed uniformly on the surface of the substrate 1a per at least a unit of the observed area. Since the conductive material 1b is disposed so as to be in the island shape within the region having a sufficiently small area, practically uniform contact resistance and tab weldability are obtained.

Here, the coverage of the surface of the substrate 1a with the conductive material 1b can be determined by photographing the surface of a prepared sample using SEM (scanning electron microscope) and calculating a covered area of the substrate surface with carbon included in the photographed visual field by image processing.

Moreover, the attached amount of the conductive material 1b per unit area on the surface of the substrate 1a is preferably in the range of 0.01 to 0.50 g/m² as the attached amount of the sum of the conductive material 1b and the water-soluble resin and hydrophobic resin that are binders and are not shown in the figure. Also, the attached amount is more preferably 0.03 g/m² or more, and further preferably 0.05 g/m² or more. The attached amount is more preferably 0.40 g/m² or less, and further preferably 0.30 g/m² or less. In the case where the conductive material 1b is placed on both surfaces of the substrate 1a, it is preferred to control the attached amount to the range on each surface.

By controlling the attached amount to the range, the conductive material 1b is disposed in the island shape on the surface of the substrate 1a. Moreover, by controlling the attached amount to preferably 0.50 g/m² or less, more preferably 0.40 g/m² or less, and further preferably 0.30 g/m² or less, the coverage becomes such one that the surface of the substrate 1a is appropriately exposed, so that good tab weldability is obtained. Further, by controlling the attached amount to preferably 0.01 g/m² or more, more preferably 0.03 g/m² or more, and further preferably 0.05 g/m² or more, the contact resistance between the collector 1 and the active material layer 2 (see FIG. 2) to be laminated on the surface of the collector 1 in the case of using as an electrode in the secondary battery, can be further reduced.

Here, the attached amount of the conductive material 1b per unit area on the surface of the substrate 1a can be determined as follows. First, the mass of a sample obtained by applying a solution containing the conductive material 1b, the water-soluble resin, and the hydrophobic resin on the substrate 1a and drying the solution, is measured. Then, the sample surface is wiped with water and alcohol and the mass thereof after removal of the conductive material 1b, the water-soluble resin, and the hydrophobic resin, is measured. By dividing mass difference between them by the area of the sample, the attached amount of the conductive material 1*b* per unit area on the surface of the substrate 1*a* can be calculated.

(Substrate)

As the substrate 1*a*, a metal such as aluminum (Al) or copper (Cu) that is commonly used as an electrode material for secondary batteries, can be used. In the case of using as an electrode material for secondary batteries, the substrate 1*a* is generally used in a form of a foil having a thickness of about 5 to 50 μm. In the method for manufacturing the collector according to the present embodiment, in the case where a rolling step is carried out, rolling may be performed to achieve thinning after the solution containing the conductive material 1*b* is applied on the plate-shaped or thick foil-shaped substrate 1*a* and dried.

The substrate 1*a* is not limited to Al, Cu and the like having a specific composition and, in the case of using as an electrode, various pure metals and alloys thereof suitable for the use environment of the electrode can be used.

(Conductive Material)

Figure 2:
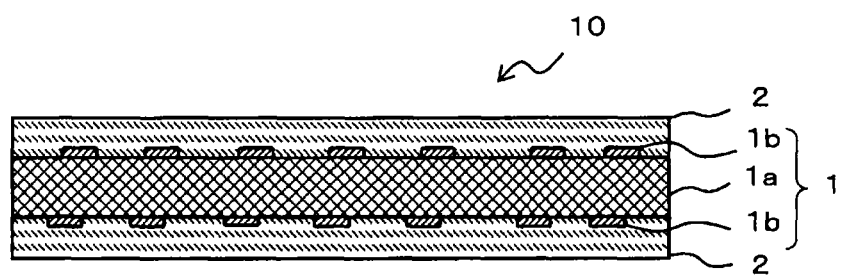
FIG. 2 is a schematic cross-sectional view for illustrating the structure of an electrode using the collector according to the present invention.

The conductive material 1*b* is disposed in the island shape so that it covers 1 to 80% of the surface of the substrate 1*a* when observed with a visual field of 300 μm square and reduces the contact resistance between the collector 1, which is constituted of the conductive material together with the substrate 1*a*, and the active material layer (see FIG. 2).

As the conductive material 1*b*, a carbonaceous conductive material (carbon) can be used. As the carbonaceous conductive material, natural or artificial crystalline graphite, expanded graphite, artificial graphite, pyrolytic graphite, or various carbon blacks such as acetylene black, can be used.

Moreover, with regard to the island structure composed of the conductive material 1*b*, good adhesion to the surface of the substrate 1*a* is secured by a binder (not shown in the figure) to be mentioned later.

(Binder)

The binder (not shown in the figure) is constituted by a hydrophobic resin for improving adhesion between the island structure composed of the conductive material 1*b* and the surface of the substrate 1*a* and a water-soluble resin for improving applicability when a solution containing the hydrophobic resin and the conductive material 1*b* is applied on the surface of the substrate 1*a*. Thereby, the adhesion between the substrate 1*a* and the island structure of the conductive material 1*b* is enhanced and the island structure is formed on the surface of the substrate 1*a* with uniform distribution.

Since the hydrophobic resin is necessarily mixed with the water-soluble resin, the hydrophobic resin is preferably a resin capable of forming an aqueous emulsion. As such a hydrophobic resin, for example, one kind or two or more kinds as a mixture selecting from polyethylene-based resins, polypropylene resins, polyester resins, urethane-based resins, acrylic resins and the like, can be used.

Moreover, as the water-soluble resin, for example, one kind or two or more kinds as a mixture selecting from carboxyvinyl polymers, carboxymethyl cellulose and salts thereof (sodium salt, ammonium salt), polyvinyl alcohol and the like, can be used.

(Electrode)

Next, the constitution of the electrode in a lithium ion secondary battery using the collector 1 according to the present embodiment is explained with reference to FIG. 2.

An electrode 10 shown in FIG. 2 is constituted by the collector 1 according to the present embodiment and the active material layer 2 laminated on the surfaces (both surfaces) of the collector 1. In the case of constituting the positive electrode in the lithium ion secondary battery, a metal such as Al or an Al alloy can be used as the substrate of the collector 1. Moreover, as a positive electrode active material, conventional materials, for example, lithium-containing oxides such as $LiCoO_2$, $LiNiO_2$, and $LiMn_2O_4$ can be used. A method for manufacturing the active material layer 2 in the positive electrode is also not particularly limited and the layer can be manufactured by conventional methods, for example, by adding a binder, and if needed, a conductive material, a solvent and the like, to the powdery lithium-containing oxide described above and thoroughly kneading them, and subsequently applying the kneaded article on the collector 1, followed by drying and pressing. The active material layer 2 may be laminated on one surface on which the conductive material 1*b* has been placed.

Moreover, in the case of constituting the negative electrode in the lithium ion secondary battery, as the substrate of the collector 1, a metal such as Cu, a Cu alloy, nickel (Ni), an Ni alloy or stainless steel, can be used. Further, as a negative electrode active material, for example, a graphite-based carbon material can be used, and production can be made in a similar manner as in the method for manufacturing the active material layer 2 in the positive electrode.

(Secondary Battery)

Figure 3:
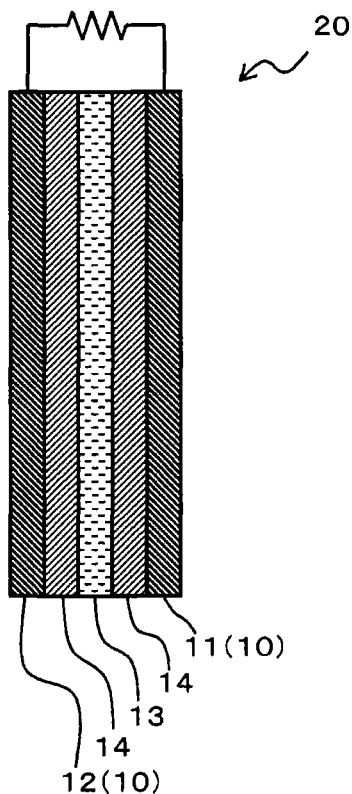
FIG. 3 is a schematic cross-sectional view for illustrating the structure of a secondary battery using the electrode according to the present invention.

The following will describe the constitution of the lithium ion secondary battery using the electrode 10 using the collector 1 according to the present embodiment, with reference to FIG. 3 (see FIG. 2 as required).

The lithium ion secondary battery (secondary battery) 20 shown in FIG. 3 includes a positive electrode 11 and a negative electrode 12 that are the electrode 10 using the collector 1 according to the present embodiment, a separator 13, and an electrolytic solution 14. The positive electrode 11 and the negative electrode 12 are separated by the separator 13, and the electrolytic solution 14 fills the space between the positive electrode 11 and the negative electrode 12 and the separator 13. Moreover, the entire lithium ion secondary battery 20 is housed in a vessel (not shown in the figure), and a metal-made tab (not shown in the figure) is welded to each of the positive electrode 11 and the negative electrode 12, which are electrically connected to an electrode terminal (not shown in the figure).

In the positive electrode 11 and the negative electrode 12, respective active material layers 2 containing each of the above-described positive electrode active material and negative electrode active material are formed on the surface of the collector 1 according to the present embodiment.

Moreover, the separator 13 and the electrolytic solution 14 can be each constituted using conventional materials. As the separator 13, for example, a polyethylene-based microporous film having a thickness of 20 to 30 μm can be used. As the electrolytic solution 14, for example, a non-aqueous electrolytic solution obtained by dissolving an electrolyte such as $LiPF_6$ or $LiBF_4$ in an organic solvent such as propylene carbonate or ethylene carbonate, can be used.

Figure 4:
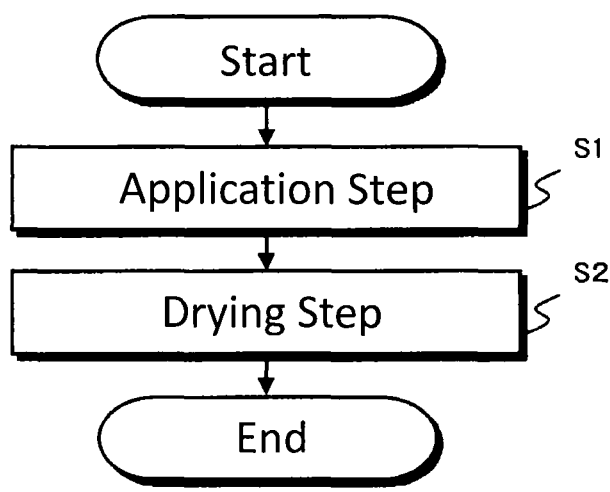
FIG. 4 is a flow chart showing a flow of the method for manufacturing a collector according to the present invention.

The following will describe the method for manufacturing the collector 1 according to the present embodiment, with reference to FIG. 4 (see FIG. 1 as required).

[Manufacturing Method]

As shown in FIG. 4, the method for manufacturing the collector 1 in the present embodiment includes an application step S1 and a drying step S2 in this order.

The collector 1 can be prepared by a manufacturing method including the application step S1 of applying a slurry containing the conductive material 1*b*, an aqueous emulsion of the hydrophobic resin and the water-soluble resin on the surface of the substrate 1*a* composed of a metal foil and agglomerating the conductive material 1b in the slurry before or after the application on the substrate 1a, and the drying step S2 of drying the slurry.

Here, the conductive material 1b homogeneously dispersed immediately after the slurry is formulated is agglomerated with the passage of time. Namely, the conductive material 1b is agglomerated before or after the application of the formulated slurry on the surface of the substrate 1a. In the slurry applied on the surface of the substrate 1a, the conductive material 1b form a state of being agglomerated in the island shape. Thereafter, the slurry is dried to fix the conductive material 1b in the island shape on the surface of the substrate 1a. On this occasion, the hydrophobic resin fills the space between the substrate 1a, and the particles of the conductive material 1b being in contact with the substrate 1a and the island structure of the conductive material 1b can be strongly fixed to the surface of the substrate 1a with good adhesion. Namely, the island structure is fixed to the surface of the substrate 1a as a mixed body of the conductive material 1b, the hydrophobic resin, and the water-soluble resin to be described later.

The following will describe the application step in detail.

(Application Step)

First, the application step S1 will be described.

In order to agglomerate the conductive material 1b so as to be an ideal island structure, it is effective to control the particle diameter and concentration of the conductive material 1b and the concentration of the hydrophobic resin and the water-soluble resin as binders, which are contained in the slurry. In the case where the particle diameter and concentration of the conductive material 1b and the concentration of the binders are controlled, viscosity of the slurry is varied, so that coatability and distribution of the conductive material 1b after drying are changed. In the case of using carbon as the conductive material 1b, it is preferred to use carbon having an average particle diameter of 0.01 to 1 µm. Also, the state where carbon is contained in an amount of 0.1 to 7% by mass in the slurry is preferred. By controlling the average particle diameter to 0.01 µm or more and the concentration (content) to 7% by mass or less, the viscosity of the slurry is not exceedingly increased and the agglomeration of carbon particles one another becomes not exceedingly large, and thus, the ideal island structure can be obtained. Moreover, by controlling the average particle diameter of the carbon as the conductive material 1b to 1 µm or less and the concentration of the carbon to 0.1% by mass or more, the island structure is formed and also contact points between the carbon as the conductive material 1b and the metal foil as the substrate 1a sufficiently exist, so that the effect of reducing the contact resistance between the collector 1 and the active material layer 2 (see FIG. 2) can be obtained.

Also, by using the hydrophobic resin, the island structure of the conductive material 1b can be disposed on the substrate 1a that is a metal foil with good adhesion. Therefore, when the electrode is prepared, peeling of the island structure of the conductive material 1b can be prevented until the application step of the active material layer 2 (see FIG. 2).

The concentration of the hydrophobic resin is preferably 0.01% by mass or more and about 11% by mass or less, more preferably 0.10% by mass or more, and further preferably 0.25% by mass or more.

Furthermore, by dispersing the hydrophobic resin in water as an aqueous emulsion, the hydrophobic resin and the water-soluble resin can be mixed.

As the hydrophobic resin (aqueous emulsion resin), for example, one kind or two or more kinds as a mixture selecting from polyethylene-based resins, polypropylene resins, polyester resins, urethane-based resins, acrylic resins and the like, can be used.

The slurry that is an aqueous emulsion solution of the hydrophobic resin in which the conductive material 1b is dispersed is repelled in the above-described concentration range of the hydrophobic resin owing to water repellency of the surface of the substrate 1a, and hence there is such a problem in coatability that the slurry becomes in a so-called water-repelled state to form drops. In order to perform coating so that the slurry is not repelled on the surface of the substrate 1a and does not form drops, it is necessary to increase the concentration of the hydrophobic resin exceeding the above-described concentration range to enhance the viscosity of the slurry sufficiently. However, in the case where the concentration of the hydrophobic resin is too high, the contact resistance (i.e., internal resistance of the secondary battery) becomes high, so that characteristics on the contact resistance cannot be satisfied.

Accordingly, in the present embodiment, wettability with respect to the substrate 1a that is a metal foil is improved by mixing the water-soluble resin into an aqueous emulsion solution of the hydrophobic resin. Thereby, coating of the substrate 1a with the coating solution becomes possible without forming drops, and the island structure of the conductive material 1b can be fixed to the substrate 1a with good adhesion.

As the water-soluble resin, for example, one kind or two or more kinds as a mixture selecting from carboxyvinyl polymers, carboxymethyl cellulose and salts thereof (sodium salt, ammonium salt), polyvinyl alcohol and the like, can be used.

The concentration of the water-soluble resin is preferably controlled to 0.25% by mass or more and about 11% by mass or less.

Furthermore, as an amount of resins necessary and sufficient for satisfactorily adhering the island structure of the conductive material 1b to the surface of the substrate 1a, total resin concentration of the hydrophobic resin and the water-soluble resin is preferably controlled to 0.5 to 11% by mass. Good coatability and adhesion can be obtained by controlling the amount to 0.5% by mass or more and a good effect of reducing the contact resistance (internal resistance of the secondary battery) can be obtained by controlling the amount to 11% by mass or less.

Moreover, as the conductive material 1b, a carbonaceous material can be used. Specifically, natural or artificial crystalline graphite, expanded graphite, artificial graphite, pyrolytic graphite, and various carbon blacks such as acetylene black, can be used.

For the application of the solution containing the conductive material 1b on the surface of the substrate 1a, application methods by means of various coaters such as a bar coater, a roll coater, a gravure coater, a reverse gravure coater, a dip coater, and a spray coater, can be used. The conductive material 1b is applied on both surfaces or one surface of the substrate 1a.

(Drying Step)

The drying step S2 is a step of vaporizing the solvent after the application step S1. In the drying step S2, drying may be performed at room temperature or drying under heating may be performed by using a heat treatment furnace or the like according to needs.

Moreover, drying temperature is preferably controlled to 100° C. to 170° C., and more preferably 140° C. to 170° C.

as a temperature at which water as a solvent of the aqueous emulsion solution is easily evaporated (reason for lower limit) and strength of the metal foil as the substrate 1a is not lowered (reason for upper limit). Particularly, by controlling the temperature to 140° C. or higher, the hydrophobic resin is softened by heat and thus the adhesion between the substrate 1a and the hydrophobic resin is improved. As a result, the adhesion between the substrate 1a and the conductive material 1b can be further improved.

Moreover, drying time is not particularly limited but, in the case where drying is conducted at 100° C. to 170° C., the time is preferably controlled to 0.1 minutes to 5 minutes. The solvent can be sufficiently evaporated by controlling the time to 0.1 minutes or more and a decrease in strength of the metal foil as the substrate 1a can be prevented by controlling the time to 5 minutes or less.

(Pressure-Bonding/Rolling Step)

In order to further improve the adhesion and contact resistance, pressure-bonding or rolling may be performed according to needs after the drying step S2. As methods of pressure-bonding and rolling, various rolling mills and roll press mills can be used.

EXAMPLES

The following will describe the collector according to the present embodiment by comparing Examples that satisfy the requirements of the present invention with Comparative Examples that do not satisfy the requirements of the present invention.

Samples were prepared by the following methods.
(Substrate)

As a substrate, an Al foil having a thickness of 15 μm, which was made of an Al alloy of 1000 type, or a Cu foil having a thickness of 20 μm, which was made of pure copper of 99.99%, was used.

In Tables 1 to 3 described later, which of the Al foil or the Cu foil was used in each sample was shown in the column of substrate as "Al" or "Cu", respectively.
(Hydrophobic Resin)

As a hydrophobic resin, an aqueous emulsion solution using polypropylene (PP) or polyethylene (PE) was prepared and the prepared aqueous emulsion solution was diluted with pure water to use. For comparison, a sample using no hydrophobic resin was also prepared.
(Water-Soluble Resin)

As a water-soluble resin, carboxymethyl cellulose (CMC) sodium salt was used. For comparison, a sample using no water-soluble resin was also prepared.
(Conductive Material)

As a conductive material, carbon black (TOKABLACK #4300 manufactured by Tokai Carbon Co., Ltd.) having an average particle diameter of 0.06 μm was used.
(Application Step)

In the application, pure water was used as a solvent, and for each sample, a solution (slurry) prepared at the concentration of the carbon black (conductive material), the kind and concentration of the hydrophobic resin, and the concentration of the water-soluble resin, shown in Tables 1 to 3, was applied on the surface of the substrate by means of a bar coater.

For the sample for evaluation of weldability, the above slurry containing the carbon black was applied on both surfaces of the substrate and, for the samples for evaluation of other items, the slurry was applied on one surface of the substrate.

Moreover, for samples No. 1 to No. 11, for applying the solution containing the conductive material, a count No. 2 bar coater was used. Further, for samples No. 12 to No. 23, besides changing the slurry composition, the attached amount of the conductive material per unit area on the substrate was varied by appropriately changing the count number of the bar coater used. These samples were prepared in the same manner as in the cases of the other samples except that the count number (count No. 2 for samples No. 12, No. 13 and No. 21, count No. 3 for samples No. 14 and No. 18 to No. 20, count No. 5 for samples No. 15 to No. 17, and count No. 10 for samples No. 22 and No. 23 were used) of the bar coater used in the application step was different.
(Drying Step)

After the slurry containing the carbon black was applied on the surface of the substrate, drying was performed by keeping in an oven at 150° C. for 1 minute.
<Evaluation Methods>
(Evaluation of Coatability)

For the evaluation of coatability, in the application step described above, the case where the coated slurry formed drops on the substrate owing to water repellency was ranked as bad (x) and the case where no water repellency was observed and the coated slurry could homogeneously cover the surface of the substrate was ranked as good (○).
(Evaluation of Adhesion)

A roller (having a diameter of 90 mm, a width of 50 mm and mass of 700 g) to which a pressure-sensitive adhesive tape having a pressure-sensitive adhesive force of 2 N/40 mm, a width of 40 mm, a length of 120 mm, and a thickness of 0.08 mm had been attached was rolled on the surface of a sample by 100 mm and area of peeled carbon black was estimated. The case where no peeling of carbon black was observed was ranked as excellent (○), the case where 20% or less of peeling was observed was ranked as good (Δ), and the case where farther peeling was observed was ranked as bad (x).
(Evaluation of Coverage)

The coverage with the conductive material (carbon) was determined by photographing the surface of a sample at a magnification of 300 using a field emission-type scanning electron microscope (FE-SEM) SU-70 manufactured by Hitachi Ltd. and calculating an area of the substrate surface covered with carbon included in the photographed visual field by image processing.
(Evaluation of Weldability 1)

For the evaluation of weldability in the case of using the Al foil as a substrate, ten sheets of a sample in which the carbon black (conductive material) had been formed on both surfaces of the Al foil having a thickness of 15 μm were overlaid, an aluminum foil having a thickness of 30 μm and an aluminum sheet having a thickness of 250 μm were placed at upper and lower parts thereof (both ends), and welding was conducted in a condition of imparting a constant pressure. The case where eight sheets or more were welded was ranked as good and the case where only seven sheets or less were welded was ranked as bad. For the welding, an ultrasonic welding machine MH2026/CLF2500 manufactured by SONOBOND Co. was used and the welding was performed at a weld time of 70 μsec under the conditions of a pressure of 0.28 MPa, an output of 400 W, and an energy of 20 J.
(Evaluation of Weldability 2)

For the evaluation of weldability in the case of using the Cu foil as a substrate, ten sheets of a sample in which the carbon black (conductive material) had been formed on both surfaces of the Cu foil having a thickness of 20 μm were overlaid, and welding was conducted in a condition of imparting a constant pressure. The case where eight sheets or more were welded was ranked as good and the case where only seven sheets or less were welded was ranked as bad. For the welding, a spot welding machine HSW-02A manufactured by Yokodai. jp Co. was used and the welding was performed at a weld time of 500 μsec at a voltage of 25V.
(Evaluation of Internal Resistance of Battery)

Both surfaces of a sample on which the carbon black (conductive material) had been formed was coated at a thickness of 25 μm per one surface with a slurry obtained by mixing lithium cobaltate, acetylene black and PVdF (polyvinylidene fluoride) to prepare a positive electrode. Moreover, as a negative electrode, one obtained by coating both surfaces of the Al foil with graphite at a thickness of 35 μm per one surface was used.

Using these positive and negative electrodes, a battery cell was prepared using an HS flat cell manufactured by Hohsen Corp. For the battery cell, after a three-cycle conditioning charge-discharge treatment was conducted at a current of a charge-discharge rate of 0.2 C, a discharge test was carried out at plural current values of 0.2 C to 10 C. In the discharge curve at each current value obtained from the discharge test, a relationship between the current value and voltage value at discharging a capacity of 1 mAh was plotted, and internal resistance was calculated based on the slope of the straight line obtained by the plotting.

Moreover, using only a substrate of the Al foil having a thickness of 15 μm and having no conductive material as a collector, a positive electrode was prepared in the same manner as in the case of the other samples, and a battery cell was similarly prepared using the positive electrode. For the battery cell, a discharge curve was determined similarly to the battery cells using the other samples, and internal resistance was calculated. Then, it was judged that those exhibiting reduced internal resistance in comparison to the internal resistance of the battery cell prepared using the collector composed of only the substrate had an effect of reducing the internal resistance. The internal resistance of the battery cell prepared using only the Al foil that is a substrate as the collector was 45 Ω.
(Evaluation of Contact Resistance)

The contact resistance (effect of reducing resistance) in the case of using the Cu foil as a substrate was measured as follows.

Both surfaces of a sample was sandwiched with two sheets of a carbon cloth, the outsides were further sandwiched with two sheet of a copper electrode having a contact area of 1 cm$^2$, and pressurization was conducted by imparting a load of 1 kgf (9.8 N) to the copper electrode. Then, a current of 7.4 mA was applied using a direct current power source and a voltage imparted between the carbon cloths was measured with a voltmeter. The contact resistance was determined by calculation from the above current value, contact area, and measured voltage. Similar measurement was performed using the substrate alone and it was judged that those exhibiting reduced contact resistance in comparison to the case of only the substrate had an effect of reducing the contact resistance. The contact resistance in the case of only the Cu foil as a substrate, which was not subjected to any surface treatment, was about 100 [mΩ·cm$^2$ (milliohm square centimeter)].
(Evaluation of Attached Amount)

The attached amount of the conductive material per unit area on the substrate was measured by the following procedure. In the present Examples, the attached amount of the conductive material per unit area on the substrate is an attached amount per unit area on one surface of the substrate and is an attached amount of the sum of the carbon black as a conductive material and the water-soluble resin and hydrophobic resin as binders.

First, the mass of a sample obtained by applying a solution containing the conductive material, the water-soluble resin and the hydrophobic resin on the substrate and drying it was measured. Then, the surface of the sample was wiped with water and dried. Subsequently, the same surface of the sample was wiped with alcohol to remove the hydrophilic resin, the lipophilic resin, and the conductive material attached on the foil. The mass of the sample after the removal of the resins and the conductive material was measured. The attached amount of the conductive material per unit area on the substrate was calculated by dividing the mass difference of the sample before the removal of the conductive material and after the removal of the conductive material by the area of the substrate.

In the Examples, an Al foil or Cu foil having a size of 50 mm square (i.e., area of 2,500 mm$^2$) was used as the substrate (i.e., sample).

Tables 1 and 2 show a list of characteristic evaluation results and judgment results of samples prepared using the Al foil as a substrate.

In Tables 1 and 2, "○" represents a good judgment result and "x" represents a bad judgment result. Moreover, in Tables 1 and 2, a numerical value judged as bad was underlined.

TABLE 1

| Sample No. | Substrate | Concentration of carbon black (% by mass) | Species of hydrophobic resin | Concentration of hydrophobic resin (% by mass) | Concentration of water-soluble resin (% by mass) | Total Concentration of resins (% by mass) |
|---|---|---|---|---|---|---|
| 1 | Al | 1 | PP | 1 | 1 | 2 |
| 2 | Al | 0.3 | PP | 0.25 | 0.5 | 0.75 |
| 3 | Al | 6 | PP | 1 | 1 | 2 |
| 4 | Al | 3 | PP | 2 | 1 | 3 |
| 5 | Al | 2 | PP | 1 | 1 | 2 |
| 6 | Al | 5 | PP | 5 | 5 | 10 |
| 7 | Al | 1 | PE | 0.5 | 2 | 2.5 |
| 8 | Al | 0 | — | 0 | 0 | 0 |
| 9 | Al | 14 | PP | 5 | 5 | 10 |
| 10 | Al | 2 | PP | 0 | 2 | 2 |
| 11 | Al | 2 | PP | 1.5 | 0 | 1.5 |

TABLE 1-continued

| Sample No. | Coatability | Adhesion | Internal resistance (Ω) | Weldability (1) (sheet) | Weldability (2) (sheet) | Coverage (%) | Judgment |
|---|---|---|---|---|---|---|---|
| 1 | ○ | ○ | 30 | 10 | — | 24 | ○ |
| 2 | ○ | Δ | 41 | 10 | — | 4 | ○ |
| 3 | ○ | ○ | 36 | 8 | — | 70 | ○ |
| 4 | ○ | ○ | 28 | 10 | — | 50 | ○ |
| 5 | ○ | ○ | 29 | 10 | — | 39 | ○ |
| 6 | ○ | ○ | 30 | 8 | — | 66 | ○ |
| 7 | ○ | ○ | 38 | 10 | — | 19 | ○ |
| 8 | — | — | 45 | 10 | — | 0 | X |
| 9 | ○ | ○ | 35 | 0 | — | 100 | X |
| 10 | ○ | X | 27 | 10 | — | 36 | X |
| 11 | X | — | — | — | — | — | X |

TABLE 2

| Sample No. | Substrate | Concentration of carbon black (% by mass) | Species of hydrophobic resin | Concentration of hydrophobic resin (% by mass) | Concentration of water-soluble resin (% by mass) | Total Concentration of resins (% by mass) |
|---|---|---|---|---|---|---|
| 12 | Al | 0.1 | PP | 0.25 | 0.75 | 1 |
| 13 | Al | 0.5 | PP | 0.1 | 0.5 | 0.6 |
| 14 | Al | 1 | PP | 0.25 | 0.5 | 0.75 |
| 15 | Al | 3 | PP | 0.01 | 0.5 | 0.51 |
| 16 | Al | 3 | PP | 0.05 | 0.75 | 0.8 |
| 17 | Al | 3 | PP | 0.1 | 1 | 1.1 |
| 18 | Al | 2 | PE | 0.5 | 2 | 2.5 |
| 19 | Al | 1 | PP | 1 | 1 | 2 |
| 20 | Al | 5 | PP | 2 | 2 | 4 |
| 21 | Al | 3 | PP | 5 | 5 | 10 |
| 22 | Al | 6 | PP | 1 | 1 | 2 |
| 23 | Al | 10 | PP | 5 | 5 | 10 |

| Sample No. | Attached amount (g/m²) | Coatability | Adhesion | Internal resistance (Ω) | Weldability (1) (sheet) | Weldability (2) (sheet) | Coverage (%) | Judgment |
|---|---|---|---|---|---|---|---|---|
| 12 | 0.01 | ○ | ○ | 40 | 10 | — | 4 | ○ |
| 13 | 0.03 | ○ | ○ | 39 | 10 | — | 5 | ○ |
| 14 | 0.05 | ○ | Δ | 35 | 10 | — | 7 | ○ |
| 15 | 0.18 | ○ | ○ | 30 | 10 | — | 18 | ○ |
| 16 | 0.23 | ○ | ○ | 25 | 10 | — | 28 | ○ |
| 17 | 0.25 | ○ | ○ | 24 | 10 | — | 31 | ○ |
| 18 | 0.10 | ○ | ○ | 31 | 9 | — | 13 | ○ |
| 19 | 0.15 | ○ | ○ | 29 | 10 | — | 32 | ○ |
| 20 | 0.31 | ○ | ○ | 24 | 8 | — | 49 | ○ |
| 21 | 0.38 | ○ | ○ | 27 | 8 | — | 58 | ○ |
| 22 | 0.47 | ○ | ○ | 25 | 8 | — | 74 | ○ |
| 23 | 0.60 | ○ | ○ | 32 | 0 | — | 100 | X |

Figure 5:
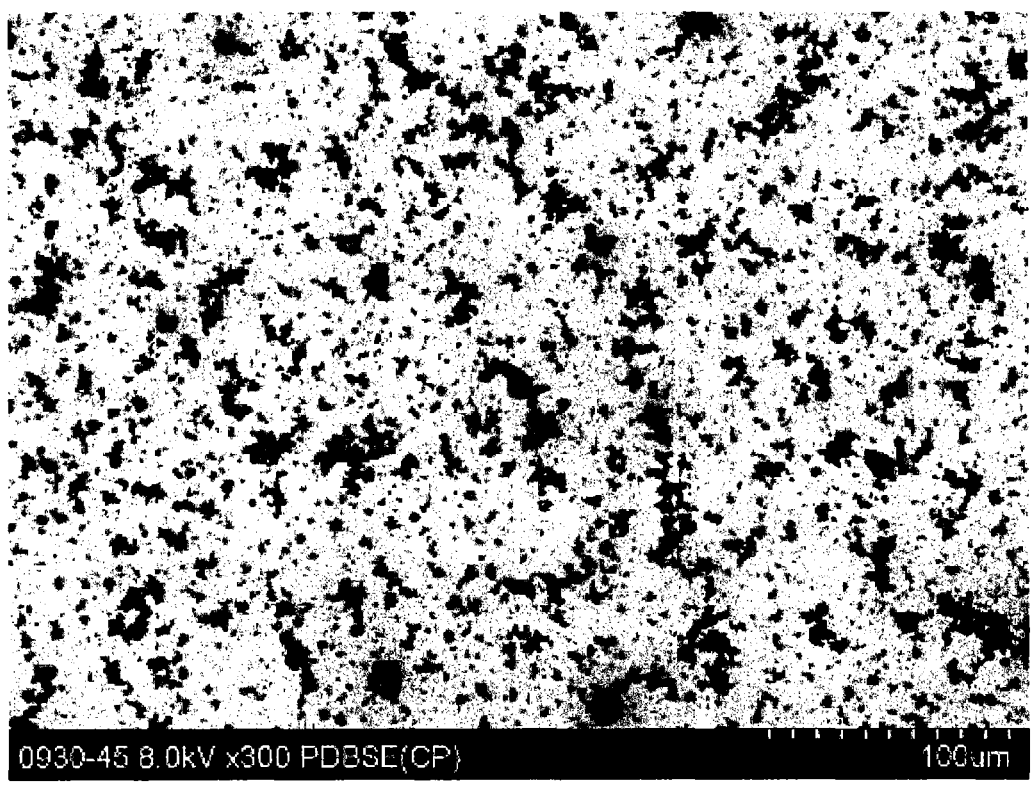
FIG. 5 is a picture of the surface of a sample of the collector according to Example on a scanning electron microscope.
Figure 6:
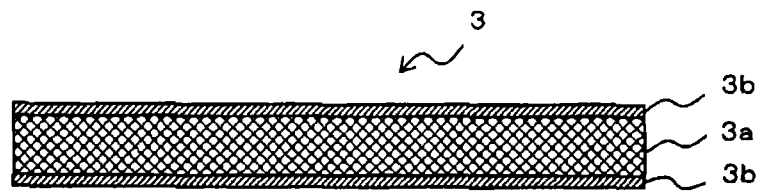
FIG. 6 is a schematic cross-sectional view for illustrating the structure of collectors according to conventional technologies.

As shown in Table 1, Samples No. 1 to No. 7 were satisfactory in all evaluations (coatability, adhesion, internal resistance, weldability, and coverage) and it was confirmed that carbon black (conductive material) was disposed in the island shape by the observation using SEM. The SEM (scanning electron microscope) picture shown in FIG. 5 is one obtained by photographing the surface of Sample No. 1 and, in FIG. 5, one division shown in the lower right part is 10 μm.

Sample No. 8 is a comparative example, which is a case where a battery cell is prepared using an electrode in which a collector of only the Al foil as a substrate is used without using carbon black (conductive material). The internal resistance of the battery cell was 45 Ω.

Sample No. 9 is the case where the concentration of carbon black (conductive material) in the slurry is so high as 14% by mass. Therefore, the coverage with carbon black is so high as 100% and no island structure was present, so that weldability was not excellent.

Sample No. 10 is a result of the case where only the water-soluble resin was used without using the hydrophobic resin. The coverage was 36%, which fallen within the range of 1 to 80%, and the coatability, the effect of reducing the internal resistance, and the weldability were satisfactory. However, sufficient adhesion was not obtained since the hydrophobic resin was not used.

Sample No. 11 is a result of the case where only the hydrophobic resin was used without using the water-soluble resin. Since the water-soluble resin was not used, it was impossible to apply the slurry containing carbon black on the surface of the substrate satisfactorily.

As shown in Table 2, Samples No. 12 to No. 22 were satisfactory in all evaluations (coatability, adhesion, internal resistance, weldability (1), and coverage). When the attached amount of the conductive material is 0.01 g/m² or more, the internal resistance of the batteries becomes 90% or less of the internal resistance (45Ω) in the case where an Al foil having no conductive material was used and it could be confirmed that the contact resistance was significantly decreased.

Sample No. 23 is the case where the concentration of carbon black (conductive material) in the slurry is so high as 10% by mass. Therefore, the attached amount of the conductive material on the substrate surface was large and thus no island structure was formed, so that the weldability (1) was not excellent.

Table 3 shows a list of characteristic evaluation results and judgment results of samples prepared using the Cu foil as a substrate. In Table 3, "○" represents a good judgment result and "x" represents a bad judgment result. Moreover, in Table 3, a numerical value judged as bad was underlined.

resin. The coverage was 45%, which fallen within the range of 1 to 80%, and the coatability, the effect of reducing the internal resistance, and the weldability (2) were satisfactory. However, sufficient adhesion was not obtained since the hydrophobic resin was not used.

While the present embodiments of the present invention has been described in detail and with reference to specific embodiments thereof, it will be appreciated that the present invention is not limited thereto, and the present invention will be carried out with various modification without departing from the scope of the claims.

This application is based on Japanese Patent Application No. 2011-234320 filed on Oct. 25, 2011 and Japanese Patent Application No. 2012-194663 filed on Sep. 5, 2012, the entire subject matters of which are incorporated herein by reference.

TABLE 3

| Sample No. | Substrate | Concentration of carbon black (% by mass) | Species of hydrophobic resin | Concentration of hydrophobic resin (% by mass) | Concentration of water-soluble resin (% by mass) | Total Concentration of resins (% by mass) |
|---|---|---|---|---|---|---|
| 24 | Cu | 1 | PP | 1 | 1 | 2 |
| 25 | Cu | 1 | PE | 0.3 | 0.3 | 0.6 |
| 26 | Cu | 5 | PP | 0.25 | 1 | 1.25 |
| 27 | Cu | 2 | PP | 5 | 5 | 10 |
| 28 | Cu | 6 | PP | 1 | 1 | 2 |
| 29 | Cu | 0 | — | 0 | 0 | 0 |
| 30 | Cu | 10 | PP | 5 | 5 | 10 |
| 31 | Cu | 2 | PP | 1 | 0 | 1 |
| 32 | Cu | 3 | PP | 0 | 1 | 1 |

| Sample No. | Coatability | Adhesion | Contact resistance (mΩ·cm²) | Weldability (1) (sheet) | Weldability (2) (sheet) | Coverage (%) | Judgment |
|---|---|---|---|---|---|---|---|
| 24 | ○ | ○ | 49 | — | 10 | 28 | ○ |
| 25 | ○ | Δ | 82 | — | 10 | 8 | ○ |
| 26 | ○ | Δ | 21 | — | 10 | 63 | ○ |
| 27 | ○ | ○ | 32 | — | 10 | 44 | ○ |
| 28 | ○ | ○ | 28 | — | 8 | 50 | ○ |
| 29 | — | — | 108 | — | 10 | 0 | X |
| 30 | ○ | ○ | 14 | — | 0 | 100 | X |
| 31 | X | — | — | — | — | — | X |
| 32 | ○ | X | 41 | — | 10 | 45 | X |

As shown in Table 3, Samples No. 24 to No. 28 were satisfactory in all evaluations (coatability, adhesion, internal resistance, weldability (2), and coverage) and it was confirmed that carbon black (conductive material) was disposed in the island shape by the observation using SEM.

Sample No. 29 is a comparative example, which is the case where a battery cell was prepared using an electrode in which a collector of only the Cu foil as a substrate was used without using carbon black (conductive material). The contact resistance was 108 mΩ·cm².

Sample No. 30 is the case where the concentration of carbon black (conductive material) in the slurry is so high as 10% by mass. Therefore, the coverage with carbon black was so high as 100% and no island structure was present, so that the weldability (2) was not excellent.

Sample No. 31 is a result of the case where only the hydrophobic resin was used without using the water-soluble resin. Since the water-soluble resin was not used, it was impossible to apply the slurry containing carbon black on the surface of the substrate satisfactorily.

Sample No. 32 is a result of the case where only the hydrophilic resin was used without using the hydrophobic

INDUSTRIAL APPLICABILITY

According to the electrode material of the present invention, a conductive material is disposed in the island shape on the surface of a metal foil that is a substrate and the attached amount of the conductive material is limited, and thus, the contact resistance between the active material layer and the electrode material can be reduced while weldability of a tab or the like is secured. Moreover, the island structure is adhered to the metal foil that is a substrate using the hydrophobic resin and water-soluble resin as binders and thus peeling of the formed island structure can be suppressed during the handling of the electrode material and in the manufacturing step before coating with the active material layer, and the effect of reducing the contact resistance by the island structure is not impaired.

According to the method for manufacturing the electrode material of the present invention, since the island structure of the conductive material can be formed on the surface of the substrate with good adhesion, an electrode material having a good weldability of a tab or the like and capable of reducing the contact resistance with the active material layer, can be manufactured with stable quality. Moreover, owing to the use of an aqueous solution, an environmental laod induced by solvent vapor in the manufacturing step can be reduced.

Further, according to the method for manufacturing the electrode material of the present invention, since the carbon is used in an appropriate concentration as a conductive material, an electrode material in which a suitable island structure is formed can be manufactured.

Furthermore, according to the method for manufacturing the electrode material of the present invention, since the resins are used in appropriate concentration, an electrode material having good quality can be manufactured.

According to the electrode of the present invention, the contact resistance between the electrode material and the active material layer can be reduced.

Moreover, according to the secondary battery of the present invention, internal resistance can be reduced.

DESCRIPTION OF REFERENCE NUMERALS AND SIGNS

1: Collector (electrode material)
1a: Substrate
1b: Conductive material
2: Active material layer
10: Electrode
11: Positive electrode (electrode)
12: Negative electrode (electrode)
13: Separator
14: Electrolytic solution
20: Lithium ion secondary battery (secondary battery)

The invention claimed is:

1. An electrode material, comprising:
a substrate comprising a metal foil; and
a conductive material placed on at least one surface of the substrate,
wherein
the conductive material is disposed in an island shape on the surface of the substrate when observed with a visual field of 300 $\mu m^2$,
the conductive material is attached to the surface of the substrate with a hydrophobic resin and a water-soluble resin, and
an attached amount of a sum of the conductive material, the water-soluble resin and the hydrophobic resin per unit area on the surface of the substrate ranges from 0.01 to 0.50 $g/m^2$.

2. An electrode in a secondary battery, the electrode comprising:
the electrode material according to claim 1; and
an active material layer formed on a surface of the conductive material in the electrode material.

3. A secondary battery, comprising
a positive electrode, and
a negative electrode,
wherein at least one of the positive electrode and the negative electrode is the electrode according to claim 2.

4. The electrode material according to claim 1, wherein the attached amount of the sum of the conductive material, the water-soluble resin and the hydrophobic resin per unit area on the surface of the substrate is 0.03 $g/m^2$ or more.

5. The electrode material according to claim 1, wherein the attached amount of the sum of the conductive material, the water-soluble resin and the hydrophobic resin per unit area on the surface of the substrate is 0.05 $g/m^2$ or more.

6. The electrode material according to claim 1, wherein the attached amount of the sum of the conductive material, the water-soluble resin and the hydrophobic resin per unit area on the surface of the substrate is 0.40 $g/m^2$ or less.

7. The electrode material according to claim 1, wherein the attached amount of the sum of the conductive material, the water-soluble resin and the hydrophobic resin per unit area on the surface of the substrate is 0.30 $g/m^2$ or less.

8. The electrode material according to claim 1, wherein the conductive material comprises a carbonaceous material.

9. The electrode material according to claim 1, wherein the hydrophobic resin is at least one selected from the group consisting of a polyethylene-based resin, a polypropylene resin, a polyester resin, a urethane-based resin, and an acrylic resin.

10. The electrode material according to claim 1, wherein the water-soluble resin is at least one selected from the group consisting of a carboxyvinyl polymer, a carboxymethyl cellulose and a salt thereof, and a polyvinyl alcohol.

11. A method for manufacturing the electrode material according to claim 1, the method comprising
applying a slurry comprising the conductive material, the water-soluble resin, and an aqueous emulsion solution of the hydrophobic resin on the surface of the substrate, and
subsequently drying the slurry,
wherein the conductive material is agglomerated in the slurry before or after the slurry is applied on the substrate.

12. The method according to claim 11, wherein
the conductive material comprises carbon, and
a content of the carbon in the slurry is from 0.1 to 7% by mass.

13. The method according to claim 11, further comprising after the drying, pressure-bonding or rolling the conductive material.

14. The method according to claim 11, wherein
the slurry comprises the water-soluble resin in an amount of 0.25% by mass or more and the hydrophobic resin in an amount of 0.01% by mass or more, and
a sum of the amount of the water-soluble resin and the amount of the hydrophobic resin is 11% by mass or less.

15. The method according to claim 11, wherein the conductive material is agglomerated in the slurry before the slurry is applied on the substrate.

16. The method according to claim 11, wherein the conductive material is agglomerated in the slurry after the slurry is applied on the substrate.

17. The method according to claim 11, wherein the carbon has an average particle diameter of from 0.01 to 1 $\mu m$.

* * * * *